May 14, 1935.  C. E. LUCKE  2,000,966
REGULATING VALVE
Filed Nov. 17, 1931   2 Sheets-Sheet 1
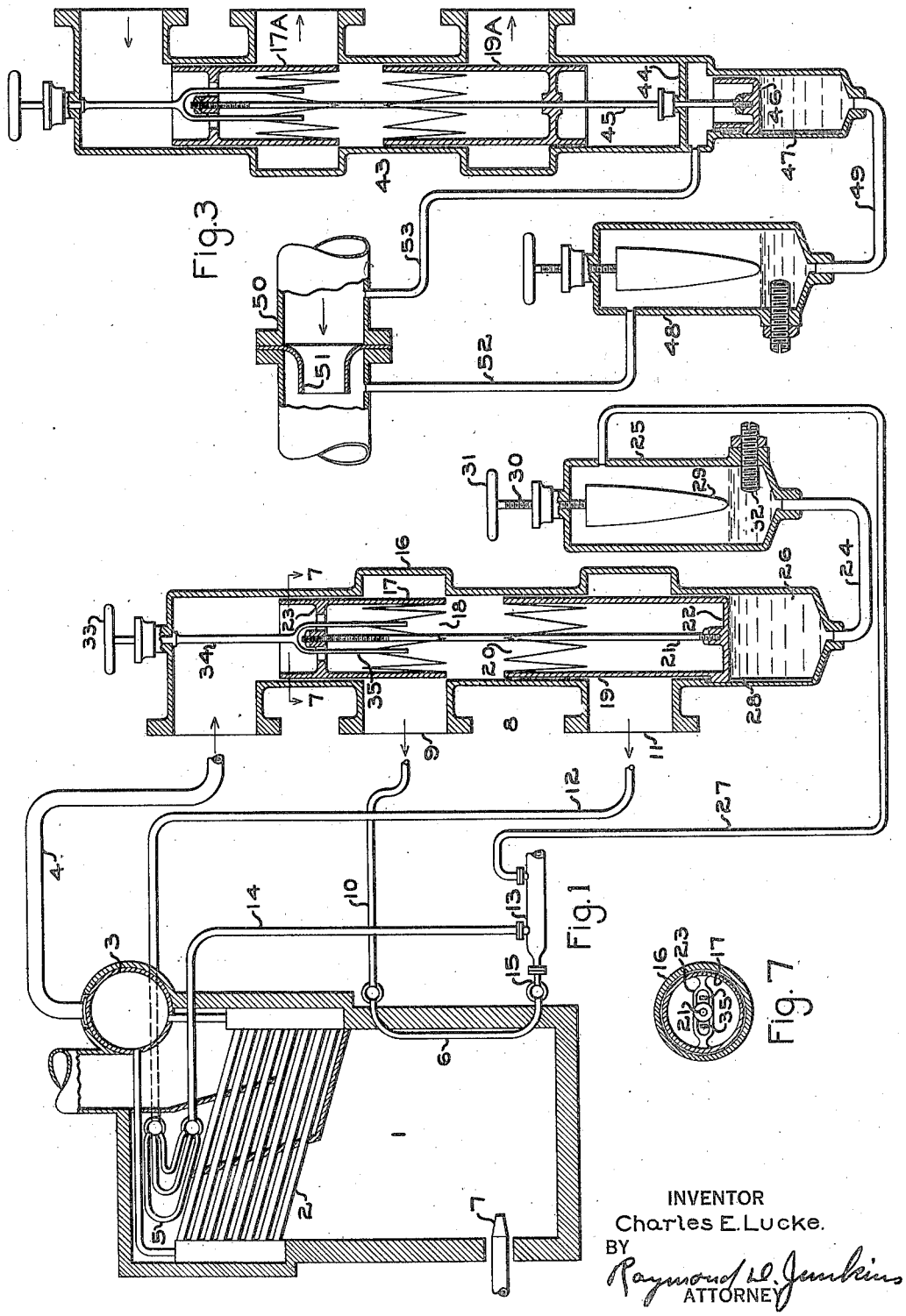
INVENTOR
Charles E. Lucke.
BY
ATTORNEY May 14, 1935.  C. E. LUCKE  2,000,966
REGULATING VALVE
Filed Nov. 17, 1931   2 Sheets-Sheet 2
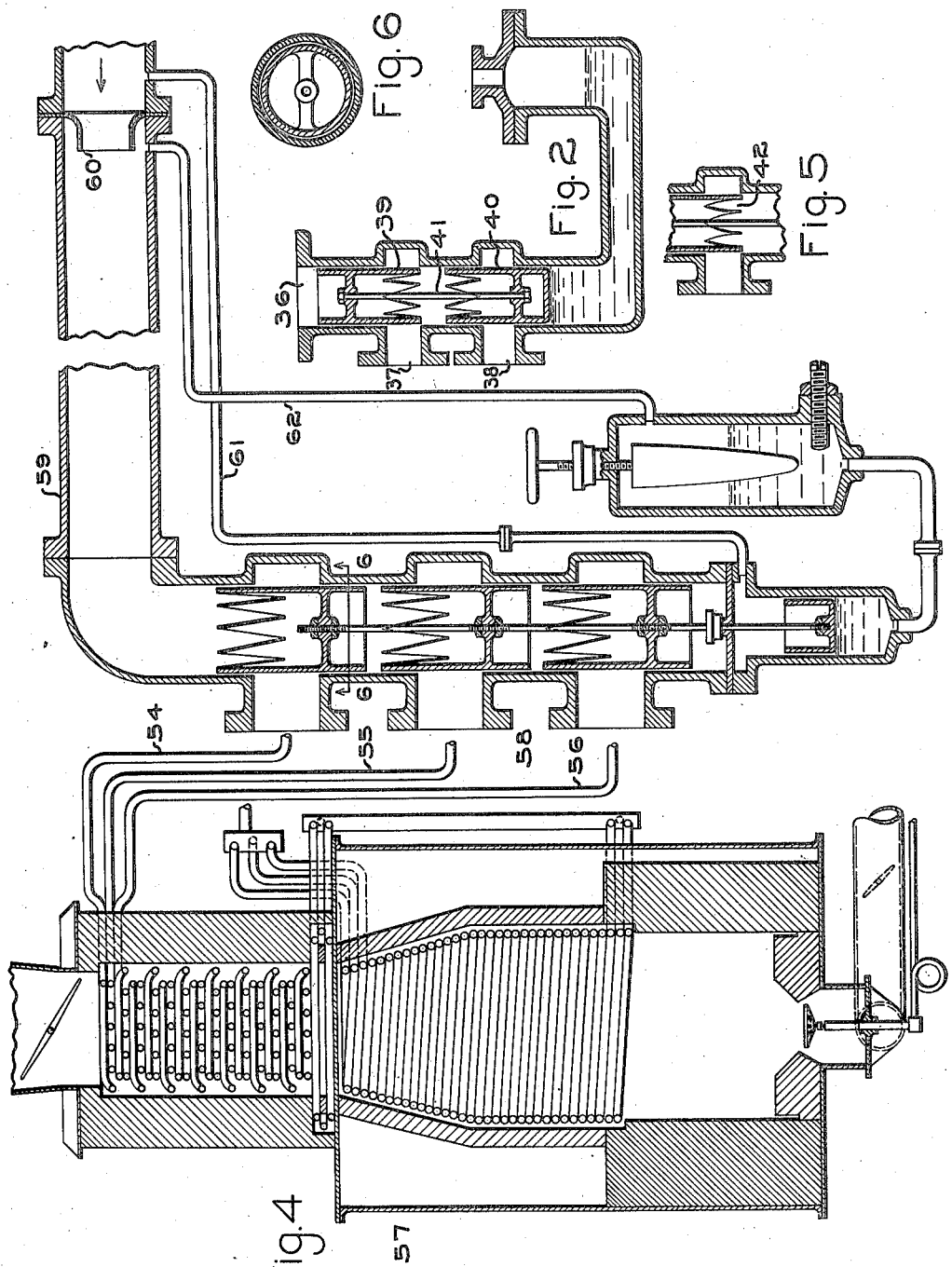
INVENTOR
Charles E. Lucke.
BY
Raymond W. Jenkins
ATTORNEY Patented May 14, 1935

2,000,966

UNITED STATES PATENT OFFICE 2,000,966

REGULATING VALVE

Charles E. Lucke, New York, N. Y., assignor to Bailey Meter Company, a corporation of Delaware Application November 17, 1931, Serial No. 575,604

7 Claims. (Cl. 137—166)

This invention relates to regulating valves such as may be used to proportion the flow of a fluid in accordance with the magnitude of a variable and forms a continuation in part of my Patent Number 1,845,301 granted February 16, 1932, for Superheaters and process of operating the same.

In the said patent I have disclosed and claimed a process for obtaining the proper degree of superheat in steam generated by a boiler which is equipped with two superheaters, one of which is heated by radiant heat from the boiler furnace and the other by contact with the hot gases of combustion passing over the same and comprising regulating the proportion of the total steam passed through each of the two superheaters. I have therein disclosed but not claimed a new and novel regulating valve for automatically so proportioning the steam to the two superheaters and which valve I will now cover by more detailed description and will claim by the present specification.

One object of my invention is to provide a regulating valve for dividing or proportioning a flowing fluid into a plurality of separate flows in desired proportionality.

Another object of the invention is to provide a regulating valve for proportioning or dividing a flowing fluid into a plurality of streams, the rate of flow of each bearing a predetermined ratio to the rate of flow of the parent stream, which ratio may be constant throughout the range of flow or may vary to a desired degree of proportionality.

A further object is to provide means in connection with the regulating valve for varying the proportionality with which the stream of flowing fluid is to be divided.

A still further object is to provide a regulating valve wherein a flowing stream of fluid is proportioned or divided into a plurality of streams, the proportioning parts of the valve being moved or positioned responsive to the magnitude of a variable in the operation of apparatus to which the regulating valve is connected.

Still further objects will become apparent from the drawings and description forming the specification of my invention.

In the drawings:

Fig. 1 is a somewhat diagrammatic representation in sectional elevation of one embodiment of the invention.

Fig. 2 is a sectional elevation of a regulating valve corresponding to the view illustrated in Fig. 2 in my Patent Number 1,845,301.

Fig. 3 is a somewhat diagrammatic sectional elevation of a second embodiment of my invention.

Fig. 4 is a somewhat diagrammatic representation of a further embodiment of my invention in connection with a once-through boiler.

Fig. 5 is a sectional elevation of a fragment of a regulating valve.

Fig. 6 is a sectional view taken along the line 6—6 in the direction of the arrows of the regulating valve illustrated in Fig. 4.

Fig. 7 is a section through the regulating valve of Fig. 1 along the line 7—7 in the direction of the arrows.

The embodiment illustrated diagrammatically in Fig. 1 relates to a steam boiler that is provided with two superheaters, one of which may be heated by radiant heat from the boiler furnace and the other heated by contact with the hot gases of combustion passing over it. The steam passing through the respective superheaters is desirably so proportioned that the proper degree of superheat can be obtained regardless of variations in the load. The steam from the steam drum of the boiler is caused to pass through the two superheaters in parallel. The most or all of the steam is caused to pass through the radiantly heated superheater at low ratings, and larger proportions of the steam are passed through the other superheater at higher ratings.

Reference character 1 indicates the furnace of a steam generating boiler generally indicated at 2, having a steam and water separating drum 3 to which is connected a conduit 4 for the discharge of the steam. A superheater 5 which may be termed a convection superheater is located to be heated by the hot gases of combustion sweeping over it, while a superheater 6 commonly termed a radiant superheater is located to be heated by the radiant heat from the furnace 1 to which fuel for combustion is fired through any conventional burner 7 or otherwise, depending upon the nature of the fuel. The conduit 4 leads to the inlet of a two-way valve 8, having an outlet 9 communicating by means of a pipe 10 with the radiant superheater 6, and an outlet 11 communicating by means of a pipe 12 with the superheater 5. The outlets of the two superheaters are connected to a main steam header 13 through the pipes 14 and 15.

As is well known, a characteristic of radiant heat superheaters is that the temperature of the steam leaving the superheater decreases with an increase in the rate of steam flow therethrough, whereas the temperature of the steam at the outlet of a convection type superheater such as is indicated at 5 increases with an increase in the rate of steam flow therethrough. It is apparent, therefore, that by having a portion of the steam which is generated by the boiler pass through the radiant heated superheater and the remainder pass through the convection type superheater and by increasing the proportion of the steam which passes through the superheater 5 as the rate of steam output increases, the proper amount of superheat may be maintained in the header 13, regardless of the rate of operation of the boiler. The valve which I indicate generally at 8, and whose peculiar design and function I desire to claim by my present invention as hereinafter described, will automatically so divide the steam discharged by the boiler through the two superheaters as to maintain the proper steam temperature at the header 13, which temperature may be held constant throughout the range of output of the boiler or may be caused to vary in any manner desired.

In a casing 16 of the valve 8 is an upper cylindrical member 17, the lower end of which is serrated as indicated at 18 and which when positioned axially of the casing across the outlet 9 serves to control the flow of fluid therethrough. A lower cylindrical member 19, the upper end of which is serrated as indicated at 20 controls the flow of fluid through the outlet 11. The upper member 17 is spaced from and held relative to the lower member 19 by a rod 21 screw threaded into a closed head provided at the lower end of the lower member 19 as at 22, the said rod 21 being threaded through a spider 23 normal to the axis of the upper member 17.

The lower portion of the casing 16 together with a connecting pipe 24 and a chamber 25 form a U-tube containing a liquid such as mercury, for example, generally indicated at 26. The chamber 25 communicates with the steam header 13 through a pipe 27. The assembly comprising the cylindrical member 17, the cylindrical member 19, and the rod 21, are free to move axially in the casing 16, the member 19 being kept from rotation within the casing 16 through the agency of a spline 28. The lower head 22 of the member 19 rests upon the surface of the mercury 26 and is caused to rise and fall within the casing 16 upon variation in elevation of the mercury within the casing 16.

As is well known, upon an increase in the rate of steam output from the boiler, the pressure drop through the superheaters between the conduit 4 and the header 13 will increase, while with a decrease in the rate of steam output the pressure drop will decrease. Inasmuch as the pressure of the steam in the conduit 4 is effective upon the surface of the mercury in the casing 16 and the pressure of the steam in the header 13 is effective upon the surface of the mercury in the chamber 25, a variation in pressure between the steam in the conduit 4 and the steam in the header 13 will cause a variation in level of the mercury in the two legs of the U-tube in a well known manner. Thus for an increase in rate of discharge of steam from the boiler, the level of mercury within the casing 16 will tend to fall, while the level of the mercury within the chamber 25 will tend to rise, with a resulting lowering of the movable parts of the valve 8, namely the members 17 and 19 and their connecting rod.

It will be noted that the arrangement of Fig. 1 is that of no steam being discharged from the boiler and correspondingly no pressure differential existing between the conduit 4 and the steam header 13. The absence of a pressure differential across the U-tube comprising the casing 16, the connecting pipe 24 and the chamber 25 results in the mercury 26 being at the same level in both legs of the U-tube corresponding to a zero position and the movable parts of the valve assembly in one extreme of their travel.

In operation, as the rate of steam discharged from the boiler through the conduit 4 increases, the pressure differential between the boiler and the header 13 increases, with a resulting lowering of the mercury within the casing 16 and lowering of the valve assembly whereby the passage to the outlet 9 is decreased, while the passage to the outlet 11 is increased; for in lowering the member 17 its ports become less effective for passage of steam to the outlet 9, while the ports of the member 19 become more effective for passage of the steam to the outlet 11. Thus with an increase in the rate of output of steam from the boiler a lesser percentage of the steam will flow through the radiant superheater 6, while a greater percentage will flow through the convection heater 5, as is desired. The result is a temperature of steam in the header 13 in desired relation to the rate of output of the boiler.

The pressure drop through the superheaters between the conduit 4 and the header 13 bears a functional relation to the rate of steam flow therethrough, as does the relation between the temperature at the outlet of the superheaters and the rate of steam flow therethrough, which relation may vary with different boilers. It is therefore desirable to provide means for modifying the motion of the valve member within the casing 16 in response to changes in the pressure drop so that regardless of the relationship existing between such factors the proper amount of superheat can be maintained in the total steam passing from the boiler. As a means of so modifying the motion of the valve members, which I accomplish by modifying the rise and fall of mercury within the casing 16, I have shown a displacer 29 which may be of desired shape, positioned within the chamber 25 by means of a screw threaded rod 30 and having a handwheel 31 for raising and lowering it.

The displacer 29 acts to progressively vary the cross-sectional area of the chamber 25 to modify the proportion of the total mercury deflection in the U-tube which takes place in that leg of the U-tube. I further employ in the chamber 25 a submerged displacing member 32 taking the form of a screw threaded rod passing through the wall of the casing 25 and always submerged in the mercury 26, to the end that the zero pressure differential level of the mercury in the two legs of the U-tube may be varied by screwing the displacing member 32 further in or further out of the interior of the chamber 25, thus displacing more or less of the mercury 26.

As a further form of adjustability of the regulating valve, I have shown a handwheel 33 connected to a rod 34 having its lower end forked as at 35 for engagement with holes in the spider 23 whereby rotation of the handwheel 33 causes rotation of the cylindrical member 17 relative to the screw threaded rod 21. A result of such rotation of the handwheel 33 is that the member 17 will be positioned axially closer to or further from the member 19, thus varying the basic spacing of the members and of the port openings opposite the discharge passages 9 and 11. By the construction shown I may vary the relative spacing of the members 17 and 19 along the rod 21 while fluid is flowing through the regulating valve, making such adjustment external by means of the handwheel 33 and without in any way interfering with the axial movement of the valve assembly within the casing 16.

It will be seen that through the instrumentality of the adjusting handwheel 33 and the displacing member 32, I may vary the proportionality between the discharge 9 and 11 while through the shape and position of the displacing member 29 I may make the proportionality follow a functional or desired relation with the rate of flow of steam through the conduit 4 from the boiler.

In Fig. 1 I have purposely shown the regulating valve assembly to much larger scale than the boiler and boiler piping to make clear the features of my invention. I show in Fig. 7 a section through the valve assembly above the spider 23 to show clearly the formation of the spider across the member 17 and the engagement therewith of the fork 35 for turning the member 17 on the screw threaded rod 21.

I show in Fig. 2 the valve assembly as illustrated in Fig. 2 of my Patent No. 1,845,301 referred to, which is similar to the assembly I have illustrated in Fig. 1 in that a fluid entering the casing through one opening such as is indicated at 36 is proportioned in its exit through the discharge passages 37 and 38 by a regulating valve assembly having members 39 and 40 spaced apart upon a rod 41, the assembly resting upon the surface of mercury or other liquid in one leg of a U-tube of which the valve casing forms a part and positioned in the valve casing upon variation in level of the mercury within the U-tube. In Fig. 2, however, I illustrate the valve construction without means of varying the spacing of the members 39 and 40 as well as without any displacement members in the other leg of the U-tube. I show this view as identical in scope and function with that part of the disclosure of the aforementioned patent.

In Fig. 5 I have illustrated a section through a fragment of a regulating valve assembly wherein the ports of the serrated end of the cylindrical member such as that of 42 are curved or shaped to take into account variable discharge of fluids through the ports in relation to axial movement thereof, and in desired relationship thereto to compensate for characteristics or relationships as desired.

It is not essential to the functioning of my invention that the pressure differential effective upon the surfaces of the mercury in the U-tube be that of the same fluid which is flowing through and proportioned by the regulating valve. In Fig. 3 I show a regulating valve generally indicated at 43, of similar construction to the valve 8 of Fig. 1, but wherein the valve casing is partitioned off from the U-tube by a partition such as indicated at 44, while the rod 45 upon which are carried the two valve members 17A and 19A extends through the partition 44 to engage a piston part 46 cooperating in a cylinder 47 forming one leg of the U-tube of which a chamber 48 forms the other end, connected through a pipe 49. The U-tube 47, 48, 49 contains mercury and applied across the U-tube is a pressure differential bearing a known relation to the rate of fluid flow through a conduit such as 50 in which is positioned a flow nozzle 51 or other pressure difference creating device. At opposite sides of the flow nozzle 51 to the conduit 50 are connected pipes 52 and 53 joining respectively the low pressure leg 48 and the high pressure leg 47 of the U-tube.

In operation, when fluid flowing through the conduit 50 in the direction of the arrow increases as to rate of flow, the pressure differential across the flow nozzle 51 increases, whereby a greater relative pressure is effective within the chamber 47 than through the pipe 52 upon the mercury in the chamber 48, causing the mercury in the chamber 47 to lower in its level and the mercury in the chamber 48 to rise in its level, thereby resulting in a positioning of the valve mechanism within the casing 43 downwardly. When the rate of flow of fluid through the conduit 50 tends to decrease, the reverse is true and the valve mechanism within the casing 43 will be moved upwardly.

In general, the construction illustrated in Fig. 3 is that of moving the valve proportioning means relative to the discharge openings from the valve casing in accordance with a measure of the rate of flow of a fluid other than that which is passing through the valve casing.

In Fig. 4 I depict an apparatus wherein desirably is proportioned a flowing fluid to more than two discharge outlets of the valve casing. For example, water being fed to the parallel circuits 54, 55 and 56 of a once-through boiler indicated generally at 57 is so proportioned through the agency of a regulating valve 58 fed by a conduit 59.

The supply of water to the conduit 59 may be from a pump or header system and the total flow of water to the boiler controlled before such water reaches the regulating valve 58 so that the regulating valve 58 serves not to control the supply of water to the boiler as a whole but the proportioning of water supplied the boiler between the three circuits 54, 55 and 56.

The water being fed through the conduit 59 passes through a pressure difference creating device such as a flow nozzle 60 whereby is created a pressure difference across the nozzle bearing a known relation to the rate of flow of fluid therethrough, such pressure difference transmitted through pipes 61 and 62 to the high and low pressure sides respectively of a U-tube wherein is varied the level of a sealing liquid such as mercury for the axial positioning of the regulating valve members within the casing 58 to result in a proportioning of the water flowing through the conduit 59 to the parallel circuits of the boiler 57.

It will be seen that I provide in this embodiment means for introducing functional relation between rate of fluid flow and proportionality of discharge as well as means for adjusting the initial proportionality of discharge or port opening with no discharge, and further, that I may vary the relationship of the three cylindrical valve members relative to the discharge ports by spacing them closer together or further apart upon the rod to which they are held.

In effect, I may cause the water fed to the boiler 57 to be proportional equally among the circuits of the boiler or in desired proportionality between the circuits in a manner which may depend upon the proportion of heating area embodied in the different circuits or the portion of heating area which is exposed to different degrees of temperature within the furnace or boiler passes.

In Fig. 4 the arrangement of the three cylindrical valve members is illustrated as giving fixed proportionality between the three pipes 54, 55, 56. This differs from the arrangement of Fig.

3, for example, wherein the cylindrical members 17A, 19A have their serrated ends opposed axially of the valve casing so that as the valve assembly moves downward the port opening of the member 17A becomes less effective, while that of the member 19A becomes more effective, and vice versa as the assembly moves upward.

In general I illustrate my invention as embodying in a regulating valve, means for the dividing or proportioning of a flowing fluid in definite ratio or functional proportionality or in desirable accordance with the magnitude of a variable. I provide means of adjustment for varying the proportionality and show apparatus which may have embodied in it means for correcting for undesirable characteristics or for compensating for known laws. It will be understood by those skilled in the art that the illustrations which I have shown and described may form only preferred embodiments of my invention, and that I am not to be limited thereby except as to the claims in view of prior art.

In connection with the invention herein disclosed, it is to be noted that subject matter not herein claimed is disclosed and claimed in my co-pending application Serial No. 1565, filed January 12, 1935.

What I claim as new and desire to secure by Letters Patent of the United States, is:

1. A fluid regulating valve, comprising a casing from which flowing fluid passes through a plurality of outlets, valve means in said casing for proportioning the flowing fluid to said outlets, and automatic means for varying said proportionality, said automatic means responsive to a measure of the total flow of fluid through said casing.

2. A fluid regulating valve, comprising a casing from which fluid may pass through a plurality of outlets, a plurality of valve members arranged to be positioned in assembly in the casing relative to said outlets, each valve member adapted to cooperate with an outlet, said casing forming one leg of a U-tube, a chamber, a passage communicating between the casing and the chamber, and a differential pressure receiving sealing liquid in the U-tube which comprises said casing, said chamber and said passage, said assembly of valve members supported and positioned relative to said outlets by the liquid in the casing.

3. A fluid regulating valve, comprising a casing from which fluid may pass through a plurality of outlets, a plurality of valve members arranged to be positioned in assembly in the casing relative to said outlets, each valve member adapted to cooperate with an outlet, said casing forming one leg of a U-tube, a chamber, a passage communicating between the casing and the chamber, and a sealing liquid in the U-tube which comprises said casing, said chamber and said passage, said assembly of valve members supported and positioned relative to said outlets by the liquid in the casing, the sealing liquid subjected to a differential pressure bearing a known relation to the rate of flow of fluid through the outlets.

4. A fluid regulating valve, comprising a casing from which fluid may pass through a plurality of outlets, a plurality of valve members arranged to be positioned in assembly in the casing relative to said outlets, each valve member adapted to cooperate with an outlet, said casing forming one leg of a U-tube, a chamber, a passage communicating between the casing and the chamber, a sealing liquid in the U-tube which comprises said casing, said chamber and said passage, said assembly of valve members supported and positioned relative to said outlets by the liquid in the casing, the sealing liquid subjected to a differential pressure bearing a known relation to the rate of flow of fluid through the outlets, and means comprising a displacer for compensating the positioning of the assembly of valve members for the law of relationship between said differential pressure and said rate of flow of fluid.

5. A regulating valve for dividing a flowing fluid into a plurality of streams in desired proportionality with the magnitude of a variable, comprising a U-tube to which is applied a pressure differential bearing a definite relation to the magnitude of the variable, a sealing liquid in the U-tube, one leg of said U-tube forming a casing having an outlet for each of the plurality of discharge streams, a movable assembly of valve members each cooperating with an outlet, said assembly adapted to be supported and positioned by said liquid, and means for automatically varying the proportionality of the plurality of streams in response to variation in the magnitude of the variable.

6. A regulating valve, comprising in combination, a casing, a liquid therein whose level varies responsive to changes in a differential pressure, an inlet for admitting fluid into said casing, a plurality of outlets for discharging said fluid from said casing, and a valve member for each of said outlets supported and positioned by said liquid within said casing for controlling the discharge of fluid through said outlets.

7. A fluid regulating valve, comprising a casing having an inlet and a plurality of outlets, means for proportioning fluid entering the casing through said inlet to said outlets, and means for automatically varying said proportionality, said last-named means responsive to a measure of a second fluid flow.

CHARLES E. LUCKE.